UNITED STATES PATENT OFFICE.

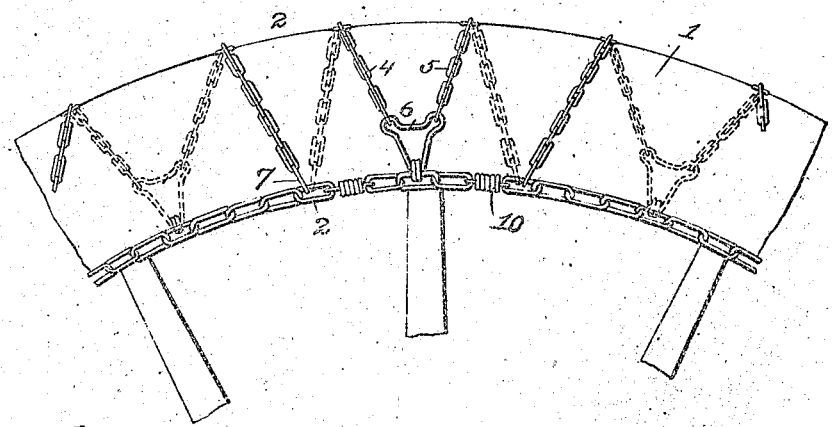
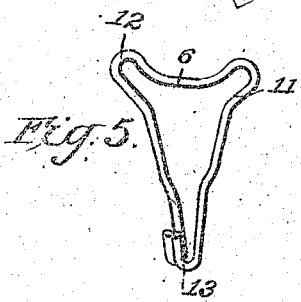
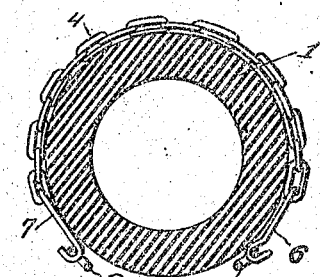
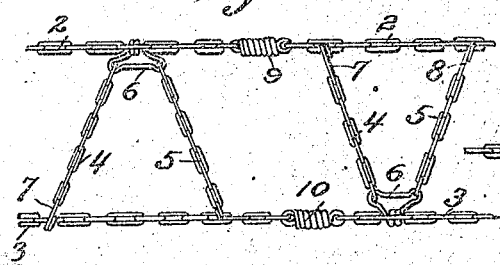
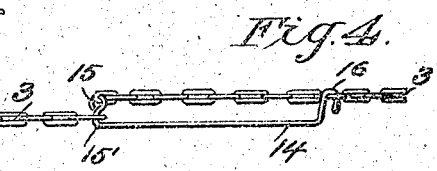

MATHEW J. FRAMBACH, OF HARTLEY, IOWA, ASSIGNOR OF ONE-HALF TO ERNEST F. BRODERS, OF HARTLEY, IOWA.

ANTISLIPPING ATTACHMENT FOR TIRES.

939,491.

Specification of Letters Patent.    Patented Nov. 9, 1909.

Application filed April 14, 1909. Serial No. 489,927.

*To all whom it may concern:*

Be it known that I, MATHEW J. FRAMBACH, a citizen of the United States, residing at Hartley, in the county of O'Brien and State of Iowa, have invented certain new and useful Improvements in Antislipping Attachments for Tires; and I do hereby declare the following to be a full, clear, and exact description of the invention, such as will enable others skilled in the art to which it appertains to make and use the same.

This invention relates to improvements in anti-slipping attachments for tires or vehicle wheels, and especially anti-slipping attachments for pneumatic or cushion tires, and has for an object the arrangement of a pair of chains and cross chains connecting the same arranged in a substantial V shape.

Another object of the invention is the arrangement of chains in the form of a V connected to side retaining chains having a yielding member interposed between each V construction.

A still further object of the invention is the arrangement of hooks for holding the side retaining chains to the V chains, and also the arrangement of a buckle or retaining pin for securing the ends of the retaining chain together.

With these and other objects in view the invention comprises certain novel constructions, combinations and arrangement of parts as will be hereinafter more fully described and claimed.

In the accompanying drawings: Figure 1 is a fragmentary side elevation of a tire with an anti-slipping attachment applied thereto embodying the features of the invention. Fig. 2 is a cross section through Fig. 1. Fig. 3 is a fragmentary top plan view of the anti-slipping attachment when removed. Fig. 4 is a fragmentary view of one of the side chains and a catch for securing the same together. Fig. 5 is an enlarged detail perspective view of a double retaining hook, embodying certain features of the invention.

Referring to the drawing by numerals, 1 indicates a tire of any desired kind to which is applied the anti-slipping attachment embodying the invention. The anti-slipping attachment is formed with side chains 2 and 3 connected by chains 4 and 5. The chains 4 and 5, together with a double-eye hook 6 and hooks 7 and 8 make a V shaped structure which holds the respective chains 4 and 5 so as to resist any slipping or skidding of the wheels. The V shaped structure made up of chains 4 and 5 and their connecting devices is spaced apart along chains 2 and 3 and preferably between each V shaped structure are arranged springs 9 and 10 for accommodating various sized tires and yet causing the chains to hug the tire closely. This is of particular advantage in pneumatic tires as different manufacturers of tires often make a slight difference in the size of the tires even though the same may be supposed to be identical. Any small difference in tires, even up to several inches will be taken up by the action of springs 9 and 10 which will thus cause the close fitting or hugging of the chains to the tire for more effectually preventing any slipping or skidding thereof.

In retaining chains 4 and 5 properly in position the double-eye hook 6 is used on one side and single-eye hooks 7 and 8 are used on the opposite side spaced apart for causing the V shaped arrangement of the chain. The double-eye hook 6 is preferably formed from some good quality of steel wire with eyes or loops 11 and 12 and a hook 13. The hooks 7 and 8 are preferably merely some good quality of steel wire that is passed through one of the links of the chain 4 or 5 and then bent around to form hooks at the opposite end which engage one of the chains 2 or 3 as occasion may require.

In order to apply the side chains 2 and 3 properly in position and to take up any extra length therein, a catch or pin 14 is provided which is secured by means of the eye 15 to one end of the side chains and arranged with a hook shaped end 16 to pass over the chain after it has been passed through one of the links as shown in Fig. 4. If the chain should be longer than necessary one of the end links could be removed or the end 16 passed through a second or third link or still farther back if desired and then hooked over as shown in Fig. 4. The hook 14 is not only formed with an eye 15 for engaging the chains but is also formed with a shoulder 15' which is adapted to engage the other end of the complete chain. From the shoulder extends the main body of the catch any desired distance and having its free end formed into a hook shaped member 16 for engaging with one of the links of the complete chain. By this construction and arrangement a catch is provided which effectually holds the ends of the chain together and is usually adapted for taking up any extra lengths thereof.

What I claim is:

1. In an anti-slipping device for tires, a pair of side chains made up of short pieces of chain joined together at suitable intervals by coiled springs adapted to engage the ends of the short pieces of chain, a plurality of groups of cross chains arranged in the form of a V and connected to the side chains by means of a triangular hook member engaging two of the cross chains and one of the side chains upon one side of a tire and single hook members connecting the cross chains with the side chain upon the opposite side of the tire substantially as shown and described.

2. In an anti-slipping device for tires, a pair of side chains each composed of short pieces of chain joined together by resilient members interposed at suitable intervals to form a complete chain of any desired length, the two ends of the complete chain being connected by a catch member having an eye engaging one end of the complete chain, the material forming the eye extending a short distance therefrom and turned at an angle to form a shoulder adapted to engage the other end of the complete chain, the turned portion extending from the shoulder portion any desired distance and having its free end formed into an engaging member to secure the catch member in engagement with one of the links of the complete chain, and cross chains connecting the two side chains substantially as shown and described.

3. In an anti-slipping device for tires, a pair of side chains formed of short lengths of chain connected by coiled springs engaging the links of the short lengths of chain, cross chains connecting with one of the side chains through the medium of an integral hook member having loops adapted to engage the ends of two of the cross chains, the loops being spaced apart, with the material forming the same extending downwardly substantially in the form of a V with the free ends thereof brought together and formed into a hook for engaging the side chain and hook members adapted to connect the opposite ends of the two cross chains with the opposite side chain substantially as shown and described.

In testimony whereof I affix my signature in presence of two witnesses.

MATHEW J. FRAMBACH.

Witnesses:
W. BROGERS,
J. H. BORDERVIERS.